(12) United States Patent
Naylor et al.

(10) Patent No.: US 10,399,551 B2
(45) Date of Patent: Sep. 3, 2019

(54) SYSTEM, METHOD, AND APPARATUS FOR IMPROVING SAFETY OF ECP-EQUIPPED TRAINS WITH FLAMMABLE CARGO

(71) Applicant: Westinghouse Air Brake Technologies Corporation, Wilmerding, PA (US)

(72) Inventors: Michael A. Naylor, Brunswick, MD (US); Donald W. Gangemella, Montgomery Village, MD (US); Richard S. Klemanski, Walkersville, MD (US); Carl L. Haas, Walkersville, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 15/062,556

(22) Filed: Mar. 7, 2016

(65) Prior Publication Data

US 2017/0253228 A1 Sep. 7, 2017

(51) Int. Cl.
| | |
|---|---|
| *B60T 17/18* | (2006.01) |
| *B60T 7/12* | (2006.01) |
| *B61L 27/04* | (2006.01) |
| *G05B 19/042* | (2006.01) |
| *H04L 29/08* | (2006.01) |

(52) U.S. Cl.
CPC ............. *B60T 17/18* (2013.01); *B60T 7/124* (2013.01); *B61L 27/04* (2013.01); *G05B 19/0428* (2013.01); *H04L 67/12* (2013.01); *B60T 2270/40* (2013.01); *B61L 2201/00* (2013.01); *G05B 2219/41279* (2013.01)

(58) Field of Classification Search
CPC ...... B60T 17/18; B60T 7/124; B60T 2270/40; B69T 17/228; B61L 27/04; B61L 2027/005; B61L 2201/00; G05B 19/0428; G05B 2219/41279; H04L 67/12
See application file for complete search history.

(56) References Cited

U.S. PATENT DOCUMENTS

| | | | |
|---|---|---|---|
| 5,987,979 A | 11/1999 | Bryan | |
| 6,557,476 B2 | 5/2003 | Batisse | |
| 8,914,162 B2 | 12/2014 | Kernwein et al. | |
| 2002/0027495 A1* | 3/2002 | Darby, Jr. | B61L 3/125 340/298 |
| 2003/0205164 A1* | 11/2003 | Engle | B61H 13/005 105/404 |

(Continued)

*Primary Examiner* — Jerrah Edwards
*Assistant Examiner* — Mathew Franklin Gordon
(74) *Attorney, Agent, or Firm* — The Webb Law Firm

(57) ABSTRACT

A safety system for a train equipped with an ECP air brake arrangement, in which the train includes at least one locomotive and at least one railcar connected to a trainline network, the system including: at least one power supply; at least one power supply controller to communicate over the trainline network and control the at least one power supply; at least one local controller to: communicate over the trainline network; receive or determine railcar data including a condition or parameter associated with the at least one railcar; and, based at least partially on the railcar data, generate at least one first message to deactivate the at least one power supply. A computer-implemented method for monitoring and responding to at least one railcar's derailment is also disclosed.

24 Claims, 7 Drawing Sheets

(56) References Cited

U.S. PATENT DOCUMENTS

| | | | |
|---|---|---|---|
| 2008/0149781 A1* | 6/2008 | Root | B60T 13/662 |
| | | | 246/167 R |
| 2013/0254576 A1* | 9/2013 | Kodaka | G06F 1/3287 |
| | | | 713/324 |
| 2013/0334373 A1 | 12/2013 | Malone, Jr. et al. | |
| 2014/0088802 A1 | 3/2014 | Knollmann et al. | |
| 2014/0131524 A1 | 5/2014 | Grimm et al. | |
| 2014/0252174 A1* | 9/2014 | Melas | B61C 17/12 |
| | | | 246/187 A |
| 2015/0158507 A1* | 6/2015 | Flamanc | B60T 7/124 |
| | | | 104/242 |
| 2015/0225002 A1 | 8/2015 | Branka et al. | |
| 2015/0291193 A1 | 10/2015 | Perras et al. | |
| 2015/0302752 A1 | 10/2015 | Holihan et al. | |
| 2015/0367862 A1* | 12/2015 | Ledbetter | B61C 5/00 |
| | | | 701/19 |
| 2016/0039439 A1 | 2/2016 | Fahmy et al. | |
| 2017/0129514 A1 | 5/2017 | Shubs, Jr. et al. | |
| 2017/0253258 A1 | 9/2017 | Bramucci et al. | |

\* cited by examiner

SYSTEM, METHOD, AND APPARATUS FOR IMPROVING SAFETY OF ECP-EQUIPPED TRAINS WITH FLAMMABLE CARGO

BACKGROUND OF THE INVENTION

Field of the Invention

The present invention is generally related to vehicle systems and networks, such as railway systems including trains travelling in a track or rail network, and more particularly, to a system, method, and apparatus for providing improved safety of trains carrying flammable cargo, including trains that are equipped with electronically-controlled pneumatic (ECP) brake arrangements.

Description of Related Art

Vehicle systems and networks exist throughout the world, and, at any point in time, a multitude of vehicles, such as cars, trucks, buses, trains and the like, are travelling throughout the system and network. With specific reference to trains travelling in a track network, the locomotives of such trains are typically equipped with or operated using train control, communication, and management systems (e.g., positive train control (PTC) systems), such as the I-ETMS® of Wabtec Corp. Such train control systems normally include at least one on-board computer that is used to manage and control the various actions of the train through interaction with the operator.

Braking systems and arrangements are required for slowing and stopping vehicles, such as cars, trucks, trains, railcars, railway vehicles, locomotives, and the like. With respect to trains and other railway vehicles, the braking system is normally in the form of a pneumatically-driven brake arrangement (e.g., an "air brake arrangement") having mechanisms and components that interact with each railcar. The air brake system for each railcar may be controlled by the operator from an on-board computer (e.g., an on-board controller, a control system, a train management computer, a computing device, a processor, and/or other like computing devices) in the locomotive that transmits data signals over a trainline (e.g., a cable extending between the locomotive and the railcars), which may be referred to as an electronically-controlled pneumatic (ECP) air brake arrangement. ECP brake systems use microprocessor and networking technologies to apply the brakes to each car in the train substantially simultaneously.

The ECP-equipped trainline may be used to communicate both digital communication signals and system power. The power for the trainline is converted from one or more locomotive batteries, or control car batteries, through a DC-to-DC converter and is transmitted through the trainline to the devices on each railcar. One example of a DC-to-DC converter is a 230 Volt DC trainline power supply, however other AC or DC voltages could be used.

One known problem with ECP brake systems pertains to its deployment on trains with flammable cargo. If a train derails, the flammable cargo can leak or escape, which may be ignited by an ignition source, such as an open flame, spark, or exposed electrical current. The resulting fire or explosion greatly increases the dangers and costs associated with a train derailment. The ECP-equipped trainline power supply is one such possible ignition source. If the ECP-equipped trainline power supply is transmitting electricity along the trainline during a derailment, and if the power transmission system and cargo-holding railcars are compromised in the derailment, the ECP-equipped trainline power supply could cause a catastrophic ignition.

Accordingly, there is a need in the art for a safety system, method, and apparatus for ECP-equipped trains to monitor for derailment and dynamically determine when to "turn off" or deactivate the trainline power supply, so as to prevent the power supply from igniting any leaking or escaping flammable cargo.

SUMMARY OF THE INVENTION

Generally, provided is a system, method, and apparatus for ECP-equipped trains that address and/or overcome a particular danger when railcars carrying flammable cargo have been breached in a derailment situation. Preferably, provided is a system, method, and apparatus employing a sensor unit and an ECP network interface to monitor a condition or parameter associated with at least one railcar and "turn off" or deactivate ECP power, which is useful in connection with railcars carrying flammable cargo. Preferably, provided is a system, method, and apparatus employing a sensor unit and an on-board computer, e.g., a head-end unit (HEU), to monitor a condition or parameter associated with at least one railcar and "turn off" or deactivate ECP power, which is useful in connection with railcars carrying flammable cargo. Preferably, provided is a system, method, and apparatus employing a sensor unit, an ECP network interface, and an on-board computer to monitor a condition or parameter associated with at least one railcar and "turn off" or deactivate ECP power, which is useful in connection with railcars carrying flammable cargo.

According to one preferred and non-limiting embodiment or aspect, provided is a safety system for a train equipped with an ECP air brake arrangement, wherein the train includes at least one locomotive and at least one railcar connected to a trainline network. The system includes at least one power supply and at least one power supply controller positioned on or associated with the train, wherein the power supply controller is programmed or configured to communicate over the trainline network and control the at least one power supply. The system further includes at least one local controller positioned on or associated with the at least one railcar, wherein the local controller is programmed or configured to: (a) communicate over the trainline network; (b) receive or determine railcar data comprising a condition or parameter associated with the at least one railcar; and, (c) based at least partially on the railcar data, generate at least one first message to deactivate, or cause the deactivation of, the at least one power supply.

In one preferred and non-limiting embodiment or aspect, the system further includes at least one sensor unit positioned on or associated with the at least one railcar, including at least one sensor controller and at least one of the following: an accelerometer, a flex sensor, a pressure sensor, a gyro sensor, a tilt sensor, an ambient air temperature sensor, and/or a car payload temperature sensor, or any combination thereof. The at least one sensor unit is configured to monitor or sense at least one of the following attributes of the railcar: vibration, flexion, compression, angular velocity, tilt, external temperature, and/or internal temperature, or any combination thereof. The railcar data associated with the at least one railcar includes at least one of the following: a level of vibration, a level of flexion, a level of compression, a level of angular velocity, a level of tilt, a level of external temperature, and/or a level of internal temperature, or any combination thereof.

In one preferred and non-limiting embodiment or aspect, the at least one local controller is further programmed or configured to: transmit the railcar data to at least one on-board computer that is configured or programmed to display or cause to display the railcar data to a locomotive operator; compare the railcar data to a threshold condition or parameter that is indicative of potential or actual derailment; determine if the railcar data surpasses the threshold condition or parameter; and in response to determining that the railcar data surpasses the threshold condition or parameter, transmit, or cause to be transmitted, an alert to the locomotive operator.

In one preferred and non-limiting embodiment or aspect, the at least one first message is a message to the at least one power supply controller to deactivate, or cause the deactivation of, the at least one power supply. In one preferred and non-limiting embodiment or aspect, the system further includes at least one on-board computer programmed or configured to send at least one second message to the at least one power supply controller. The at least one power supply controller is further programmed or configured to: receive the at least one second message; and, based at least partially on the at least one second message, deactivate, or cause the deactivation of, the at least one power supply.

In one preferred and non-limiting embodiment or aspect, the at least one first message is a message to the on-board computer to send a second message to the at least one power supply controller to deactivate, or cause the deactivation of, the at least one power supply. In one preferred and non-limiting embodiment or aspect, the at least one first message is a plurality of messages, the plurality of messages comprising at least the following: (a) a message to the on-board computer to send a second message to the at least one power supply controller to deactivate, or cause the deactivation of, the at least one power supply; and (b) a message to the at least one power supply controller to deactivate, or cause the deactivation of, the at least one power supply. In one preferred and non-limiting embodiment or aspect, the at least one second message includes at least a power state flag that represents either a powered-on state or a powered-off state, and the at least one power supply controller is further programmed or configured to deactivate, or cause the deactivation of, the at least one power supply based at least partially on the power state flag.

In another preferred and non-limiting embodiment or aspect, provided is a computer-implemented method for monitoring and responding to at least one railcar's derailment, for a train equipped with an ECP air brake arrangement, wherein the train includes at least one locomotive and the at least one railcar connected to a trainline network. The method includes: (a) receiving railcar data including a condition or parameter associated with the at least one railcar; (b) comparing the railcar data to a threshold condition or parameter; (c) determining if the railcar data surpasses the threshold condition or parameter; and (d) in response to determining that the railcar data surpasses the threshold condition or parameter, transmitting at least one first message to deactivate, or cause the deactivation of, at least one power supply positioned on or associated with the train (or any component thereof).

In one preferred and non-limiting embodiment or aspect, the method further includes: (e) transmitting the railcar data to at least one on-board computer that is configured or programmed to display or cause to display the railcar data to a locomotive operator; and (f) in response to determining that the railcar data surpasses the threshold condition or parameter, transmitting, or causing to be transmitted, an alert to the locomotive operator.

In one preferred and non-limiting embodiment or aspect, the method further includes repeating steps (a), (b), and (c) until determining that the railcar data surpasses the threshold condition or parameter. In one preferred and non-limiting embodiment or aspect, the at least one first message is a message to at least one power supply controller to deactivate, or cause the deactivation of, the at least one power supply. In one preferred and non-limiting embodiment or aspect, the method further includes sending periodic messages to at least one power supply controller, wherein the at least one first message triggers the transmission of a new message to the at least one power supply controller, and the at least one power supply controller is programmed or configured to deactivate, or cause the deactivation of, the at least one power supply based at least partially on the new message.

In one preferred and non-limiting embodiment or aspect, the method further includes sending periodic messages to at least one power supply controller. The at least one first message is a plurality of messages, the plurality of messages including at least the following: (a) a message to send a new message to the at least one power supply controller, wherein the at least one power supply controller is programmed or configured to deactivate, or cause the deactivation of, the at least one power supply based at least partially on the new message; and (b) a message to the at least one power supply controller to deactivate, or cause the deactivation of, the at least one power supply.

In one preferred and non-limiting embodiment or aspect, the periodic messages include at least a power state flag that represents either a powered-on state or a powered-off state. The new message includes at least a new power state flag being set to represent a powered-off state, and the at least one power supply controller is programmed or configured to deactivate, or cause the deactivation of, the at least one power supply based at least partially on the new power state flag.

In another preferred and non-limiting embodiment or aspect, provided is a computer program product that includes at least one non-transitory computer-readable medium including program instructions that, when executed by at least one computer including at least one processor, causes the at least one computer to execute a series of steps. These steps include: receiving railcar data comprising a condition or parameter associated with the at least one railcar; comparing the railcar data to a threshold condition or parameter; determining if the railcar data surpasses the threshold condition or parameter; and, in response to determining that the railcar data surpasses the threshold condition or parameter, transmitting at least one first message to deactivate, or cause the deactivation of, at least one power supply positioned on or associated with the train (or any component thereof). In one preferred and non-limiting embodiment or aspect, the program instructions are further configured to cause the at least one computer to display or cause to display the railcar data to a locomotive operator, and in response to determining that the railcar data surpasses the threshold condition or parameter, transmit, or cause to be transmitted, an alert to the locomotive operator.

In one preferred and non-limiting embodiment or aspect, the program instructions are further configured to cause the at least one computer to repeatedly receive new railcar data comprising a condition or parameter associated with the at least one railcar, compare the new railcar data to the threshold condition or parameter, and determine if the new railcar data surpasses the threshold condition or parameter until determining that the new railcar data surpasses the threshold condition or parameter. In one preferred and non-limiting embodiment or aspect, the at least one first message is a message to at least one power supply controller to deactivate, or cause the deactivation of, the at least one power supply. In one preferred and non-limiting embodiment or aspect, the program instructions are further configured to cause the at least one computer to send periodic messages to at least one power supply controller, wherein the at least one first message triggers the transmission of a new message to the at least one power supply controller. The at least one power supply controller is programmed or configured to deactivate, or cause the deactivation of, the at least one power supply based at least partially on the new message.

In one preferred and non-limiting embodiment or aspect, the program instructions are further configured to cause the at least one computer to send periodic messages to at least one power supply controller. The at least one first message is a plurality of messages, and the plurality of messages include at least the following: (a) a message to send a new message to the at least one power supply controller, wherein the at least one power supply controller is programmed or configured to deactivate, or cause the deactivation of, the at least one power supply based at least partially on the new message; and (b) a message to the at least one power supply controller to deactivate, or cause the deactivation of, the at least one power supply. In one preferred and non-limiting embodiment or aspect, the periodic messages include at least a power state flag that represents either a powered-on state or a powered-off state. The new message includes at least a new power state flag being set to represent a powered-off state, and the at least one power supply controller is programmed or configured to deactivate, or cause the deactivation of, the at least one power supply based at least partially on the new power state flag.

Clause 1: A safety system for a train equipped with an ECP air brake arrangement, wherein the train comprises at least one locomotive and at least one railcar connected to a trainline network, the system comprising: at least one power supply positioned on or associated with the train; at least one power supply controller positioned on or associated with the train and programmed or configured to communicate over the trainline network and control the at least one power supply; at least one local controller positioned on or associated with the at least one railcar and programmed or configured to: (a) communicate over the trainline network; (b) receive or determine railcar data comprising a condition or parameter associated with the at least one railcar; and (c) based at least partially on the railcar data, generate at least one first message to deactivate, or cause the deactivation of, the at least one power supply.

Clause 2: The safety system of clause 1, further comprising: at least one sensor unit positioned on or associated with the at least one railcar, comprising at least one sensor controller and at least one of the following: an accelerometer, a flex sensor, a pressure sensor, a gyro sensor, a tilt sensor, an ambient air temperature sensor, a car payload temperature sensor, or any combination thereof, wherein the at least one sensor unit is configured to monitor or sense at least one of the following attributes of the railcar: vibration, flexion, compression, angular velocity, tilt, external temperature, internal temperature, or any combination thereof, and wherein the railcar data associated with the at least one railcar comprises at least one of the following: a level of vibration, a level of flexion, a level of compression, a level of angular velocity, a level of tilt, a level of external temperature, a level of internal temperature, or any combination thereof.

Clause 3: The safety system of clauses 1 or 2, wherein the at least one local controller is further programmed or configured to: transmit the railcar data to at least one on-board computer that is configured or programmed to display or cause to display the railcar data to a locomotive operator; compare the railcar data to a threshold condition or parameter that is indicative of derailment; determine if the railcar data surpasses the threshold condition or parameter; and in response to determining that the railcar data surpasses the threshold condition or parameter, transmit, or cause to be transmitted, an alert to the locomotive operator.

Clause 4: The safety system of any of clauses 1-3, wherein the at least one first message is a message to the at least one power supply controller configured to cause the power supply controller to deactivate, or cause the deactivation of, the at least one power supply.

Clause 5: The safety system of any of clauses 1-4, the system further comprising: at least one on-board computer programmed or configured to send at least one second message to the at least one power supply controller, wherein the at least one power supply controller is further programmed or configured to: receive the at least one second message; and based at least partially on the at least one second message, deactivate, or cause the deactivation of, the at least one power supply.

Clause 6: The safety system of any of clauses 1-5, wherein the at least one first message is a message to the on-board computer configured to cause the on-board computer to send a second message to the at least one power supply controller, the second message configured to deactivate, or cause the deactivation of, the at least one power supply.

Clause 7: The safety system of any of clauses 1-6, wherein the at least one first message is a plurality of messages, the plurality of messages comprising at least the following: (a) a message to the on-board computer configured to cause the on-board computer to send a second message to the at least one power supply controller, the second message configured to deactivate, or cause the deactivation of, the at least one power supply; and (b) a message to the at least one power supply controller configured to cause the power supply controller to deactivate, or cause the deactivation of, the at least one power supply.

Clause 8: The safety system of any of clauses 1-7, wherein the at least one second message comprises a power state flag that represents either a powered-on state or a powered-off state, and wherein the at least one power supply controller is further programmed or configured to deactivate, or cause the deactivation of, the at least one power supply based at least partially on the power state flag.

Clause 9: A computer-implemented method for monitoring and responding to at least one railcar's derailment, for a train equipped with an ECP air brake arrangement, wherein the train comprises at least one locomotive and the at least one railcar connected to a trainline network, the method comprising: (a) receiving railcar data comprising a condition or parameter associated with the at least one railcar; (b) comparing the railcar data to a threshold condition or parameter that is indicative of railcar derailment; (c) determining if the railcar data surpasses the threshold condition or parameter; and (d) in response to determining that the railcar data surpasses the threshold condition or parameter, transmitting at least one first message configured to deactivate, or cause the deactivation of, at least one power supply positioned on or associated with the train.

Clause 10: The computer-implemented method of clause 9, further comprising: (e) transmitting the railcar data to at least one on-board computer that is configured or programmed to display or cause to display the railcar data to a locomotive operator; and (f) in response to determining that the railcar data surpasses the threshold condition or parameter, transmitting, or causing to be transmitted, an alert to the locomotive operator.

Clause 11: The computer-implemented method of clauses 9 or 10, further comprising repeating steps (a), (b), and (c) until it is determined that the railcar data surpasses the threshold condition or parameter.

Clause 12: The computer-implemented method of any of clauses 9-11, wherein the at least one first message is a message to at least one power supply controller configured to cause the at least one power supply controller to deactivate, or cause the deactivation of, the at least one power supply.

Clause 13: The computer-implemented method of any of clauses 9-12, further comprising sending periodic messages to at least one power supply controller, wherein the at least one first message triggers the transmission of a new message of the periodic messages to the at least one power supply controller, wherein the at least one power supply controller is programmed or configured to deactivate, or cause the deactivation of, the at least one power supply based at least partially on the new message.

Clause 14: The computer-implemented method of any of clauses 9-13, wherein the periodic messages comprise a power state flag that represents either a powered-on state or a powered-off state, wherein the new message comprises a new power state flag being set to represent a powered-off state, and wherein the at least one power supply controller is programmed or configured to deactivate, or cause the deactivation of, the at least one power supply based at least partially on the new power state flag.

Clause 15: The computer-implemented method of any of clauses 9-14, further comprising: sending periodic messages to at least one power supply controller, wherein the at least one first message is a plurality of messages, the plurality of messages comprising at least one the following: (a) a message to send a new message of the periodic messages to the at least one power supply controller, wherein the at least one power supply controller is programmed or configured to deactivate, or cause the deactivation of, the at least one power supply based at least partially on the new message; and (b) a message to the at least one power supply controller to deactivate, or cause the deactivation of, the at least one power supply.

Clause 16: The computer-implemented method of any of clauses 9-15, wherein the periodic messages comprise a power state flag that represents either a powered-on state or a powered-off state, wherein the new message comprises a new power state flag being set to represent a powered-off state, and wherein the at least one power supply controller is programmed or configured to deactivate, or cause the deactivation of, the at least one power supply based at least partially on the new power state flag.

Clause 17: A computer program product comprising a non-transitory computer-readable medium including program instructions that, when executed by at least one computer including at least one processor, causes the at least one computer to: receive railcar data comprising a condition or parameter associated with the at least one railcar; compare the railcar data to a threshold condition or parameter; determine if the railcar data surpasses the threshold condition or parameter; and in response to determining that the railcar data surpasses the threshold condition or parameter, transmit at least one first message to deactivate, or cause the deactivation of, at least one power supply positioned on or associated with the train.

Clause 18: The computer program product of clause 17, the program instructions further configured to cause the at least one computer to display or cause to display the railcar data to a locomotive operator, and in response to determining that the railcar data surpasses the threshold condition or parameter, transmit, or cause to be transmitted, an alert to the locomotive operator.

Clause 19: The computer program product of clauses 17 or 18, the program instructions further configured to cause the at least one computer to repeatedly receive new railcar data comprising a condition or parameter associated with the at least one railcar, compare the new railcar data to the threshold condition or parameter, and determine if the new railcar data surpasses the threshold condition or parameter until determining that the new railcar data surpasses the threshold condition or parameter.

Clause 20: The computer program product of any of clauses 17-19, wherein the at least one first message is a message to at least one power supply controller to deactivate, or cause the deactivation of, the at least one power supply.

Clause 21: The computer program product of any of clauses 17-20, the program instructions further being configured to cause the at least one computer to send periodic messages to at least one power supply controller, wherein the at least one first message triggers the transmission of a new message of the periodic messages to the at least one power supply controller, wherein the at least one power supply controller is programmed or configured to deactivate, or cause the deactivation of, the at least one power supply based at least partially on the new message.

Clause 22: The computer program product of any of clauses 17-21, the program instructions further being configured to cause the at least one computer to send periodic messages to at least one power supply controller, wherein the at least one first message is a plurality of messages, the plurality of messages comprising at least the following: (a) a message to send a new message of the periodic messages to the at least one power supply controller, wherein the at least one power supply controller is programmed or configured to deactivate, or cause the deactivation of, the at least one power supply based at least partially on the new message; and (b) a message to the at least one power supply controller to deactivate, or cause the deactivation of, the at least one power supply.

Clause 23: The computer program product of any of clauses 17-22, wherein the periodic messages comprise a power state flag that represents either a powered-on state or a powered-off state, wherein the new message comprises a new power state flag being set to represent a powered-off state, and wherein the at least one power supply controller is programmed or configured to deactivate, or cause the deactivation of, the at least one power supply based at least partially on the new power state flag.

Clause 24: The computer program product of any of clauses 17-23, wherein the periodic messages comprise a power state flag that represents either a powered-on state or a powered-off state, wherein the new message comprises a new power state flag being set to represent a powered-off state, and wherein the at least one power supply controller is programmed or configured to deactivate, or cause the deactivation of, the at least one power supply based at least partially on the new power state flag.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
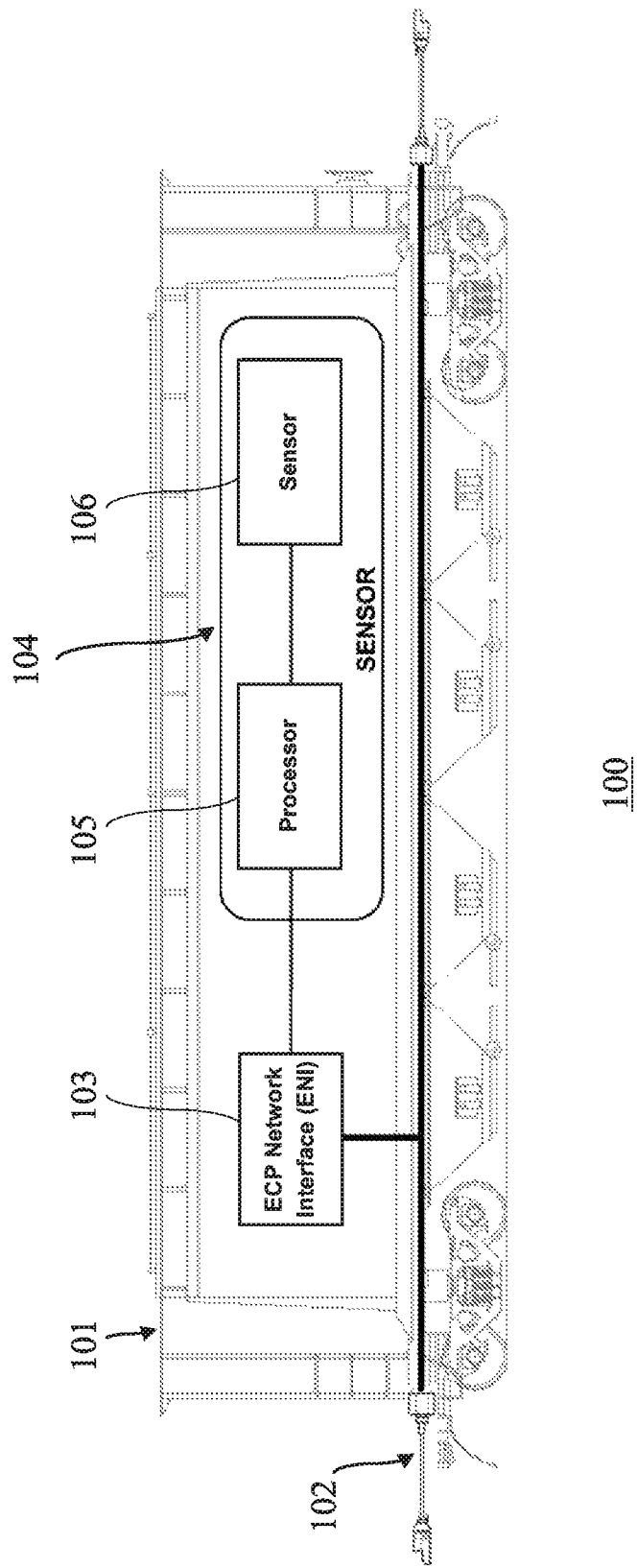
FIG. 1 is a schematic view of one embodiment or aspect of a system for improving safety of ECP-equipped trains with flammable cargo.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and process illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

As used herein, the term "on-board computer" refers to a controlling computer or computer processor that is on or associated with the train, usually located on the train's leading locomotive, while the term "local controller" refers to a controlling computer or computer processor that is on or associated with at least one railcar of the train. Such computers or computer processors, however, may be located on other locomotives, on control cars, on railcars, or even at the rear of train, in which case this computer is often part of an "end-of-train unit," or an EOT. It will be appreciated that the functions of the on-board computer as described herein may be carried out by a communicatively connected computer or computer processor, located anywhere on the train as explained above, without departing from the spirit of the system described herein. Additionally, the term "ECP network interface" refers to a computer or computer processor that is on or associated with a railcar and communicates over the train's communication network, such as the "local controller" described above. "ECP network interface" may also refer to the computer or computer processor's ability to communicate over the ECP-enabled train's communication network, through which it may provide additional control, computational, or communicative functionality.

With specific reference to FIG. 1, and in one preferred and non-limiting embodiment or aspect, provided is railcar safety system 100 for an ECP-enabled railcar 101. The railcar 101 is connected to the trainline 102 which transmits data signals and system power. Connected to the trainline 102 is an ECP network interface ("ENI") 103, which communicates with the trainline 102 network or uses another communication protocol to communicate with other devices. As discussed above, and as used herein, the ENI is in the form of a computing device or process that is programmed or configured to implement one or more of the processing or communication steps discussed herein. In this embodiment, connected to (or in direct or indirect communication with) the ENI 103 is a sensor unit 104 which may include, but is not limited to, a processor 105 and at least one sensor 106. The sensor 106 may be an accelerometer (to sense or determine acceleration in one or more directions), a flex sensor (to sense or determine the flexing of one or more components of the railcar), a pressure sensor (to sense or determine a pressure component or parameter), a gyroscopic sensor (to sense or determine orientation, rotation, angular velocity, and/or tilt), a tilt sensor (to sense or determine orientation, rotation, angular velocity, and/or tilt), an ambient air temperature sensor (to sense or determine temperature external to the railcar 101), a car payload temperature sensor (to sense or determine temperature internal to the railcar 101), and/or any other device for detecting potential or actual derailments of the railcar 101, e.g., a magnetometer, a vibration sensor, and the like. Further, sensor 106 may include a plurality of sensor devices for purposes of redundancy. One such system, method, and apparatus for detecting the varying acceleration of a railcar is shown in U.S. Pat. No. 8,914,162 to Kernwein et al., entitled "System, Method, and Apparatus to Detect and Report Track Structure Defects", which is incorporated by reference herein in its entirety. More than one type of sensor 106 may be used.

In one preferred and non-limiting embodiment or aspect, the processor 105 directly or indirectly communicates with the sensor 106 and the ENI 103. The ENI 103 is programmed or configured to receive railcar data including, but not limited to, a level of vibration, flexion, compression, angular velocity, tilt, external temperature, internal temperature, or any combination thereof. The ENI 103 is programmed or configured to, based at least partially on the railcar data, transmit signals and/or commands, e.g., messages, along the trainline 102 network, or through another communication protocol (e.g., over a wireless network), to deactivate all or specified train power supplies. It will be appreciated that the sensor's 106 railcar data may be transmitted additionally or alternatively to an on-board computer, e.g., an HEU 203, which may be located on a locomotive or a control car, wherein the on-board computer is programmed or configured to deactivate all or specified train power supplies based at least partially on the railcar data.

In one preferred and non-limiting embodiment or aspect, the railcar data may be transmitted to the on-board computer. The on-board computer may be programmed or configured to display or cause to display the railcar data to the locomotive operator. One particular condition or parameter of importance to a locomotive operator would be external or internal railcar 101 temperature. In the case of the temperature data surpassing a temperature threshold indicative of train derailment, an alert may be announced to the locomotive operator. It will be appreciated that any railcar data discussed above, including but not limited to temperature, may be broadcast to the operator or trigger an alert when surpassing a threshold condition or parameter. It will also be appreciated that the alert may be visual, aural, tactile, or any other sensory alert that may draw the operator's attention to the potentially hazardous condition. The triggering of this alert may be synchronous with or independent of the on-board computer deactivating train power supplies.

Figure 2:
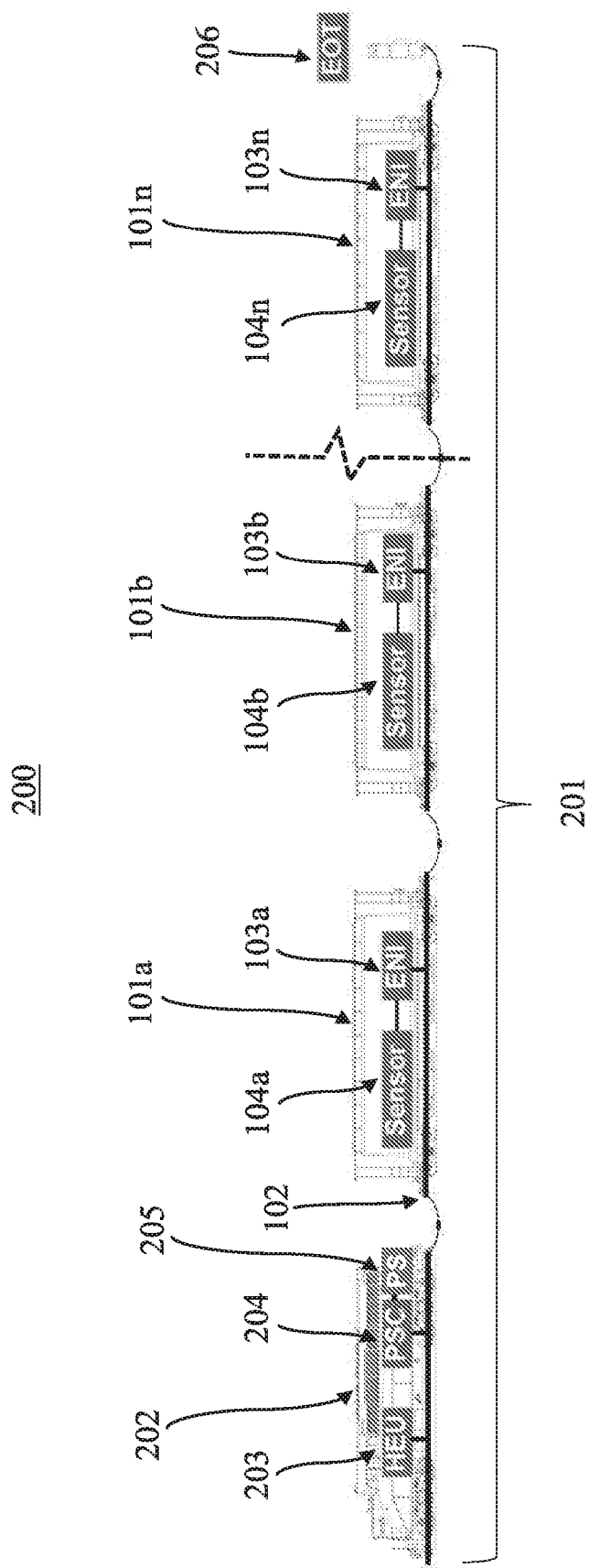
FIG. 2 is a schematic view of one embodiment or aspect of a system for improving safety of ECP-equipped trains with flammable cargo.

With specific reference to FIG. 2, and in another preferred and non-limiting embodiment or aspect, provided is a multiple railcar safety system 200 for a train 201 including a locomotive or control car 202 and a plurality of railcars 101a-101n. The locomotive 202 and railcars 101a-101n are connected to the trainline 102, such that data signals and power signals can be provided on and over the trainline 102. The locomotive 202 is equipped with at least an on-board computer 203 and a power supply controller 204, which is associated with a power supply 205 configured to deliver power to one or more of the components of the locomotive 202 and/or some or all of the railcars 101a-101n. Some embodiments may include additional locomotives and/or control cars which may contain additional power supply controllers and power supplies. The on-board computer 203 is programmed or configured to communicate with other train devices, components, and systems through the trainline 102 (or through another communications protocol).

In one preferred and non-limiting embodiment or aspect, the on-board computer 203 periodically transmits messages to the other train devices, including the power supply controller 204. For example, the message of the on-board computer 203 may contain a power state flag that is monitored by the power supply controller 204. In one preferred and non-limiting embodiment or aspect, the power state variable may be a binary power state variable, but other data structures may be used, such as an object structure, a character variable, a string message, a list, a queue, an array, or any other like storage of data. After system startup, if the flag indicates an "on" state, the power supply controller 204 stays on. If the flag indicates an "off" state, the power supply controller 204 "turns off" or deactivates the power supply 205, thereby terminating a potential ignition source for any leaked or escaped flammable material.

The train 201 may also include an end-of-train device (EOT) 206, which may be connected to the trainline 102. The EOT 206 may be configured to monitor conditions at the end of the train 201 and provide rear-of-train 201 emergency braking capability. It will be appreciated that the EOT 206 may be configured in the same manner as the on-board computer 203 described above, in that it may be programmed or configured to communicate with other train devices, components, or systems via the trainline 102 or another communications protocol, transmit messages to other train devices, including the power supply controller 204, and instruct the power supply controller 204 or directly control the power supply 205 to deactivate the power supply 205.

With further reference to FIG. 2, and in further preferred and non-limiting embodiments or aspects, each railcar 101 is equipped with at least one ENI 103 and at least one sensor unit 104. It will be appreciated, however, that some embodiments may include a train with only one railcar 101 (such as only the last railcar 101n having the EOT 206 thereon), or only some railcars 101, equipped with at least one ENI 103 and at least one sensor unit 104. Each ENI 103 directly or indirectly communicates with the trainline 102 network or uses another communication protocol to communicate with other devices. Connected to each ENI 103 is at least one sensor unit 104, which may determine, sense, and/or processes railcar data (e.g., sensed or determined data) associated with the railcar 101. Each ENI 103 may be programmed or configured to receive railcar data associated with the specified railcar 101. Each ENI 103 may be further programmed or configured to, based at least partially on the railcar data, transmit a message along the trainline 102 network, or by another communication protocol (e.g., a wireless connection, a radio connection, and the like), to cause the power supply controller 204 to deactivate its associated power supply 205. Any railcar 101 in the plurality of railcars 101a-101n is capable of independently carrying out readings and transmitting messages.

Figure 3:
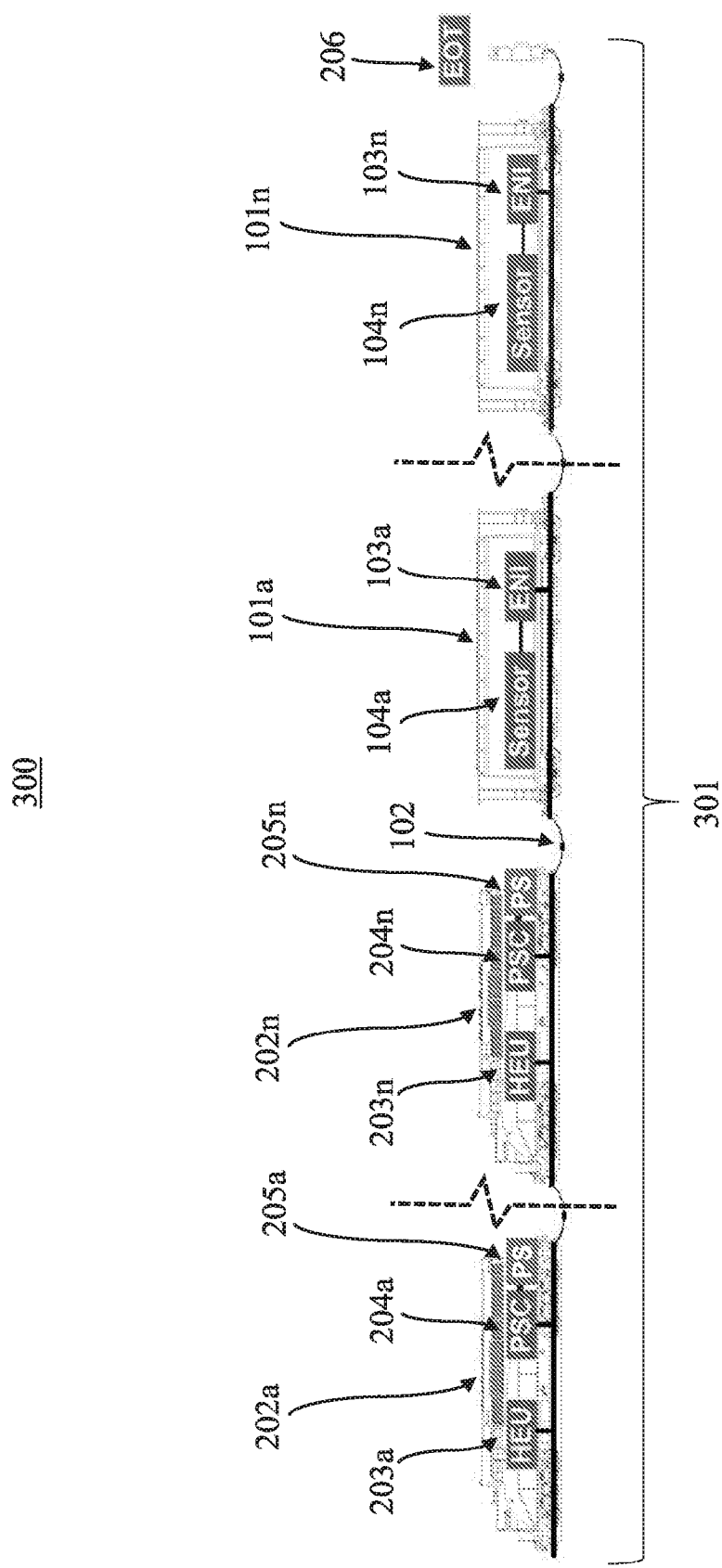
FIG. 3 is a schematic view of one embodiment or aspect of a system for improving safety of ECP-equipped trains with flammable cargo.

With specific reference to FIG. 3, and in another preferred and non-limiting embodiment or aspect, provided is a multiple railcar safety system 300 for a train 301 including a plurality of locomotives or control cars 202a-202n and a plurality of railcars 101a-101n. The locomotives 202a-202n and railcars 101a-101n are connected to the trainline 102, such that data signals and power signals can be provided on and over the trainline 102. It will be appreciated that the number of the locomotives 202 and railcars 101 may vary, being as few as one of each type. Each locomotive 202 may be optionally equipped with at least one on-board computer 203 and at least one power supply controller 204, which is associated with at least one power supply 205 configured to deliver power to one or more of the components of the locomotive 202 and/or some or all of the railcars 101a-101n. In this preferred and non-limiting embodiment, there is an on-board computer, e.g., an HEU 203, a power supply controller 204, and a power supply 205 associated with each locomotive 202 and communicatively connected in the train 301 system. The on-board computer 203 is programmed or configured to communicate with other train devices, components, and systems through the trainline 102 (or through another communications protocol).

With further reference to FIG. 3, each ENI 103 is programmed or configured to receive railcar data including, but not limited to, a level of vibration, flexion, compression, angular velocity, tilt, external temperature, internal temperature, or any combination thereof (or any other data point that, when compared to a threshold, is indicative of a railcar derailment). Each ENI 103 is programmed or configured to, based at least partially on the railcar data, transmit signals and/or commands, e.g., messages, along the trainline 102 network, or through another communication protocol (e.g., over a wireless network), to sequentially or simultaneously deactivate all or specified train power supplies 205a-205n. It will be appreciated that each railcar's 101 data may be transmitted additionally or alternatively to any one of the plurality of on-board computers, e.g., HEUs 203a-203n, wherein the on-board computers are programmed or configured to sequentially or simultaneously deactivate all or specified train power supplies 205a-205n based at least partially on the railcar data.

Figure 4:
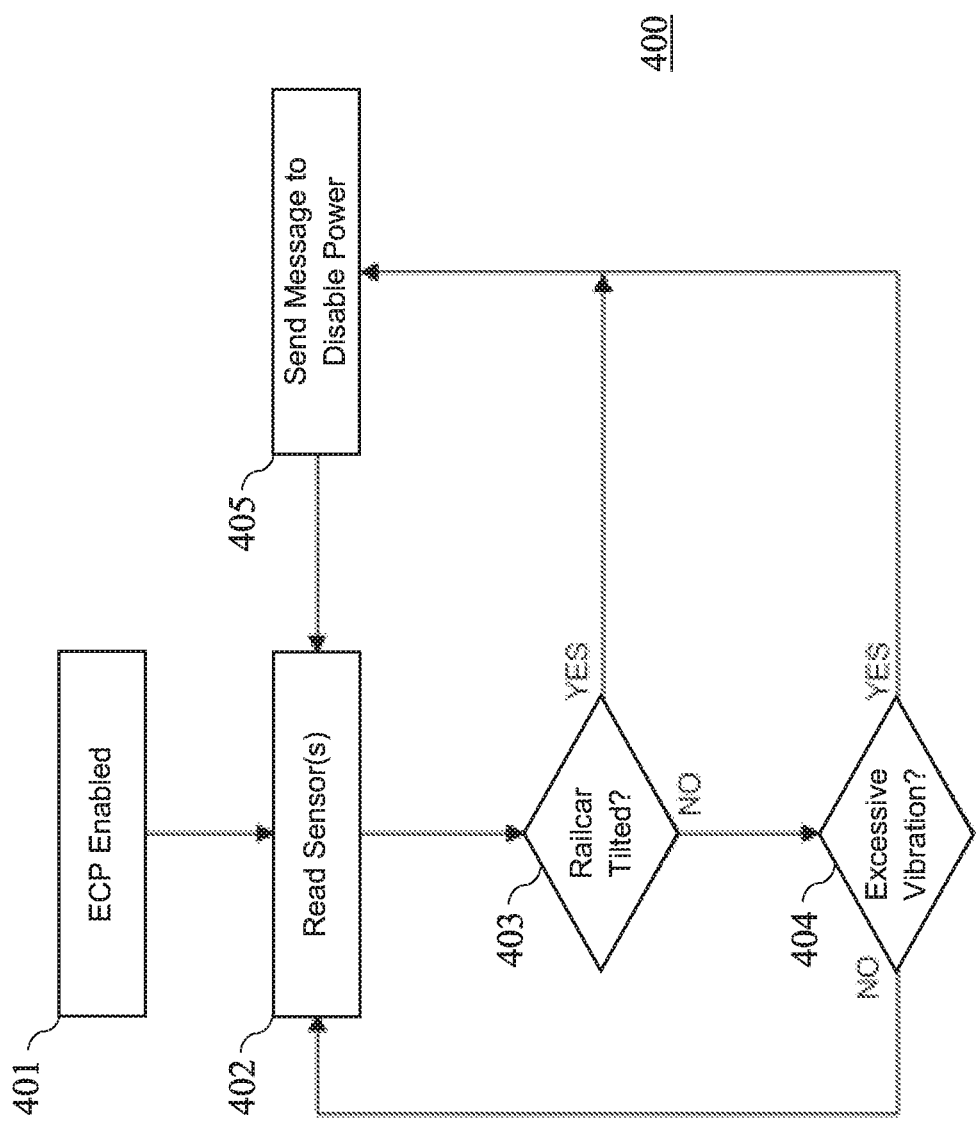
FIG. 4 is a flow diagram of one embodiment of a detection method for an ECP-enabled railcar.

In a further preferred and non-limiting embodiment or aspect, and as illustrated in FIG. 4, provided is a computer-implemented method 400 for monitoring and responding to at least one railcar's 101 derailment, for at least one ENI 103 (or local controller), on-board computer 203, EOT 206, or other like on-board computer, for a train. The exemplary configuration of FIG. 4 depicts an ENI 103 communicating with two example sensors, namely, a tilt sensor and an accelerometer, although additional or fewer sensors may be used. First, the ECP system is enabled (Step 401). Next, data is collected from the sensors 106 and communicated to the ENI 103 (Step 402). The ENI 103 then processes this information and determines if the railcar 101 has tilted outside of some configurable value or threshold (Step 403). In response to determining that the train has tilted (i.e., reached a "trigger" threshold) (Step 403), the ENI 103 generates and sends a message to disable the train's 201 power supply 205 (Step 405).

In response to determining that the railcar 101 has not tilted (i.e., has not reached a "trigger" threshold), the ENI 103 next processes the information and determines if there is excessive vibration of the railcar 101 (Step 404), in which excessive vibration is defined as vibration that may potentially cause a derailment, such as traveling at an unsafe speed for given rail conditions. In response to determining that there is excessive vibration (i.e., reached a "trigger" threshold) of the railcar 101 (Step 404), the ENI 103 generates and sends a message to disable the train's 201 power supply 205 (Step 405). In response to determining that there is not excessive vibration of the railcar (Step 404), the ENI 103 reverts to receiving updates and sensor information and data readings from the sensors 106 (Step 402). If, having proceeded to Step 405, in which the power was disabled, the ENI 103 may optionally continue receiving updates and sensor information and data readings from the sensors 106 (Step 402) to determine if the potentially dangerous conditions have been resolved. Although railcar tilt and vibration are used in this embodiment as example types of data that may indicate railcar derailment, other types of sensor data may be employed without deviating from the inventive process. Additionally, the steps conducted by the ENI 103 or other like on-board computer may be centralized in a sensor unit 104 which reads the railcar 101 data, processes the railcar 101 data, and acts accordingly by either taking additional readings or transmitting an instruction to a power supply controller 204 to deactivate its power supply 205.

Figure 5:
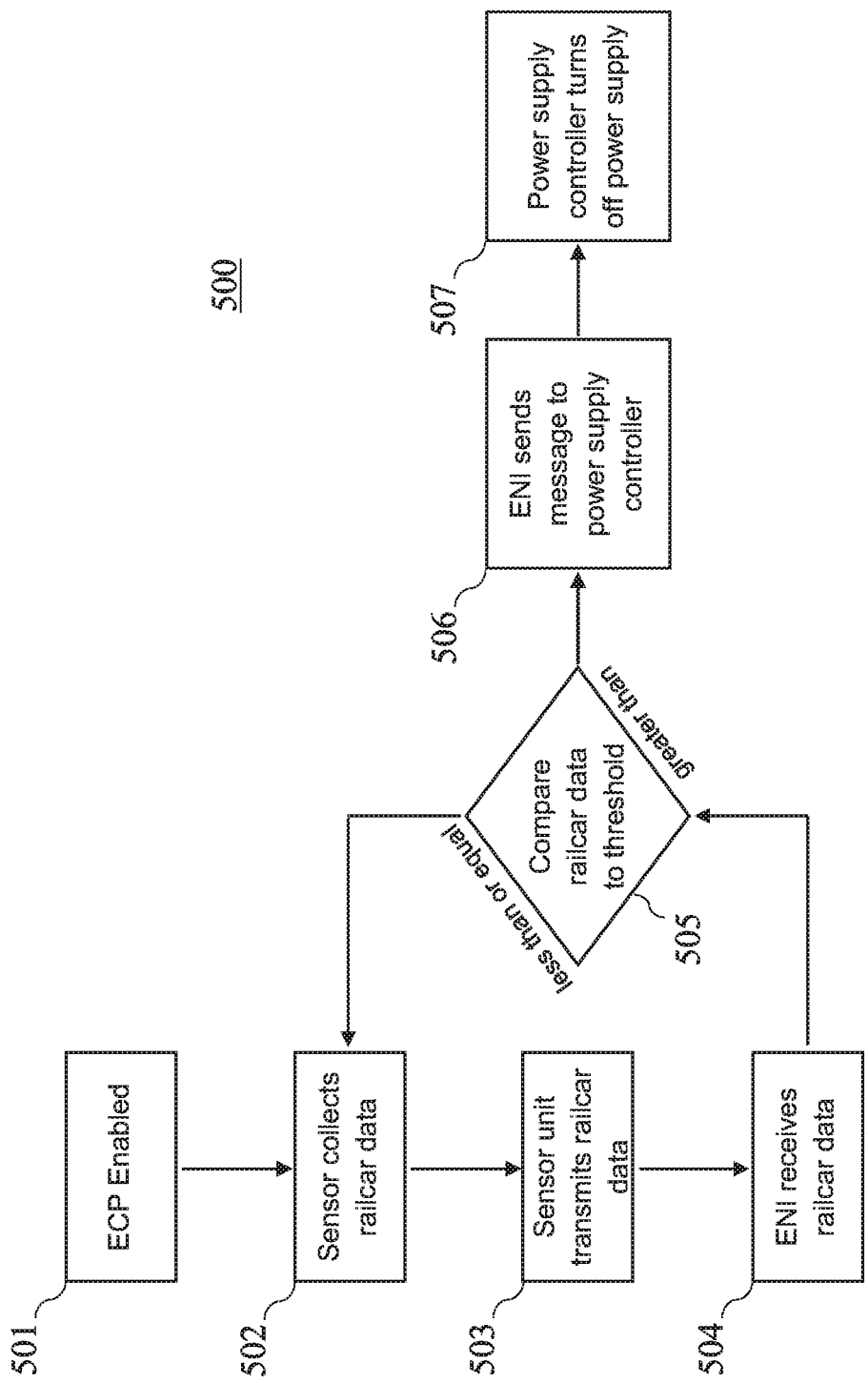
FIG. 5 is a flow diagram of one embodiment of a detection method for an ECP-enabled railcar, implemented partly by an ECP network interface and a sensor unit.

In a further preferred and non-limiting embodiment or aspect, and as illustrated in FIG. 5, provided is a computer-implemented method 500 for monitoring and responding to at least one railcar's 101 derailment for at least one ENI 103. First, the ECP system is enabled (Step 501). Next, railcar 101 data is collected via at least one sensor 106 (Step 502), which may include a level of vibration, flexion, compression, angular velocity, tilt, external temperature, and/or internal temperature, or any combination thereof (or any other data point that, when compared to a threshold, is indicative of a railcar derailment). The data is then transmitted (Step 503), either directly from the sensor 106 or from the sensor unit 104 to the ENI 103, which receives the data (Step 504). The ENI 103 compares the railcar 101 data to a threshold condition or parameter (Step 505), which may be a preset value or dynamically determined value based on other information about the railcar 101, such as speed, track location, railcar 101 location within the trainline, and the like. If the railcar 101 data does not exceed the threshold, the ENI 103 proceeds to repeat the collection of railcar 101 data (Step 502), data transmission and reception (Steps 503-504), and threshold comparison (Step 505). Alternatively, if the railcar 101 data does exceed the threshold, the ENI 103 proceeds to Steps 506-507. In these steps, the ENI 103 sends at least one message to at least one power supply controller 204 to deactivate at least one power supply 205 (Step 506), which causes the power supply 205 to deactivate (Step 507). The above steps carried out by the ENI 103 may be carried out by another like on-board computer.

Figure 6:
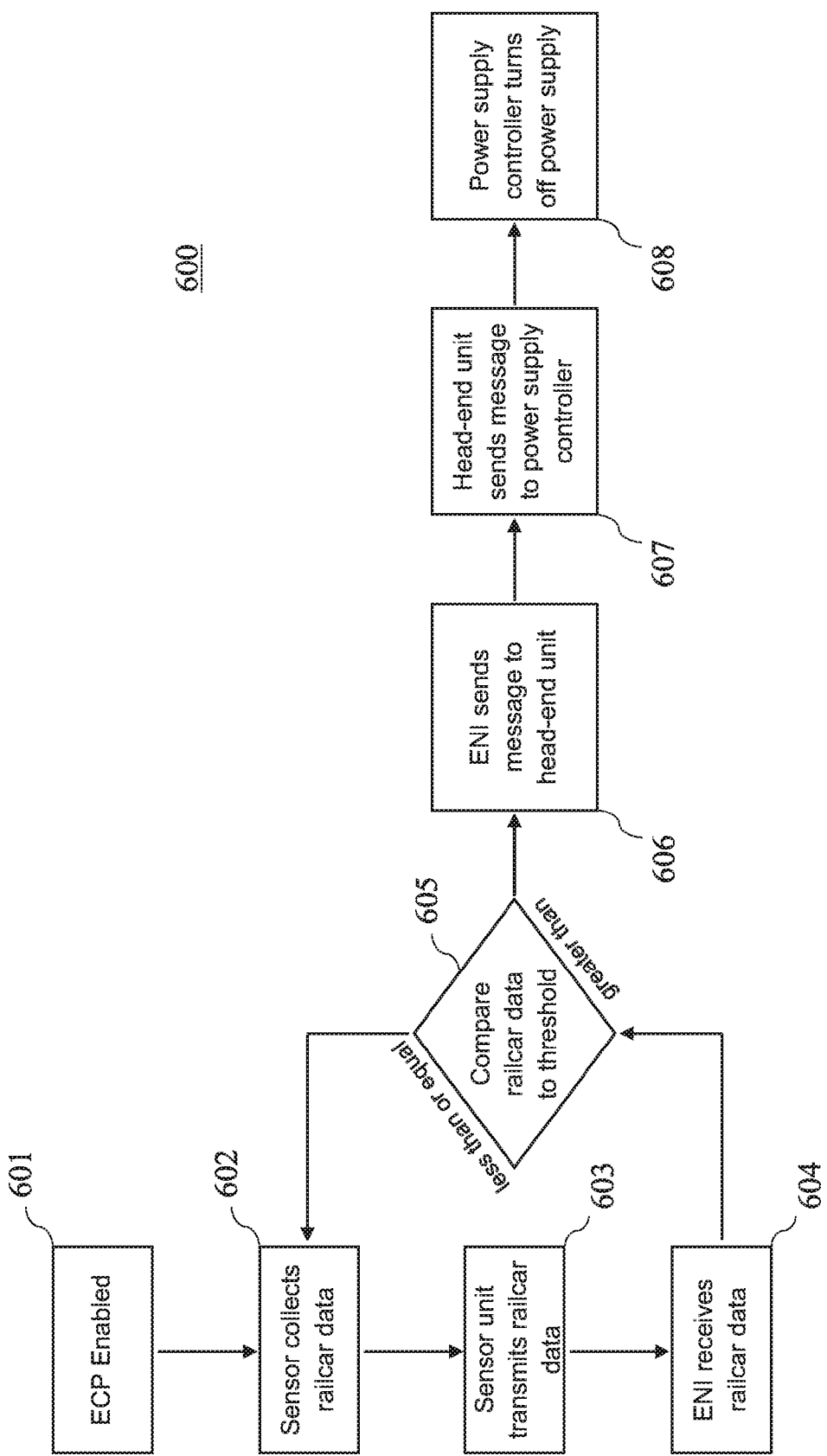
FIG. 6 is a flow diagram of one embodiment of a detection method for an ECP-enabled railcar, implemented partly by an ECP network interface, an on-board computer, and a sensor unit.

In a further preferred and non-limiting embodiment or aspect, and as illustrated in FIG. 6, provided is a computer-implemented method 600 for monitoring and responding to at least one railcar's 101 derailment for at least one ENI 103 and on-board computer 203. First, the ECP system is enabled (Step 601). Next, railcar 101 data is collected via at least one sensor 106 (Step 602), which may include a level of vibration, flexion, compression, angular velocity, tilt, external temperature, and/or internal temperature, or any combination thereof (or any other data point that, when compared to a threshold, is indicative of a railcar derailment). The data is then transmitted (Step 603), either directly from the sensor 106 or from the sensor unit 104 to the ENI 103, which receives the data (Step 604). The ENI 103 compares the railcar 101 data to a threshold condition or parameter (Step 605), which may be a preset value or dynamically determined value based on other information about the railcar 101, such as speed, track location, railcar 101 location within the trainline, and the like. If the railcar 101 data does not exceed the threshold, the ENI 103 proceeds to repeat the collection of railcar 101 data (Step 602), data transmission and reception (Steps 603-604), and threshold comparison (Step 605). Alternatively, if the railcar 101 data does exceed the threshold, the ENI 103 proceeds to Steps 606-608. In these steps, the ENI 103 sends at least one message to the on-board computer 203 (Step 606), which in turn sends a message to the power supply controller 204 (Step 607), which causes the power supply 205 to deactivate (Step 608). The above steps carried out by the ENI 103 or on-board computer 203 may be carried out by another like on-board computer.

Figure 7:
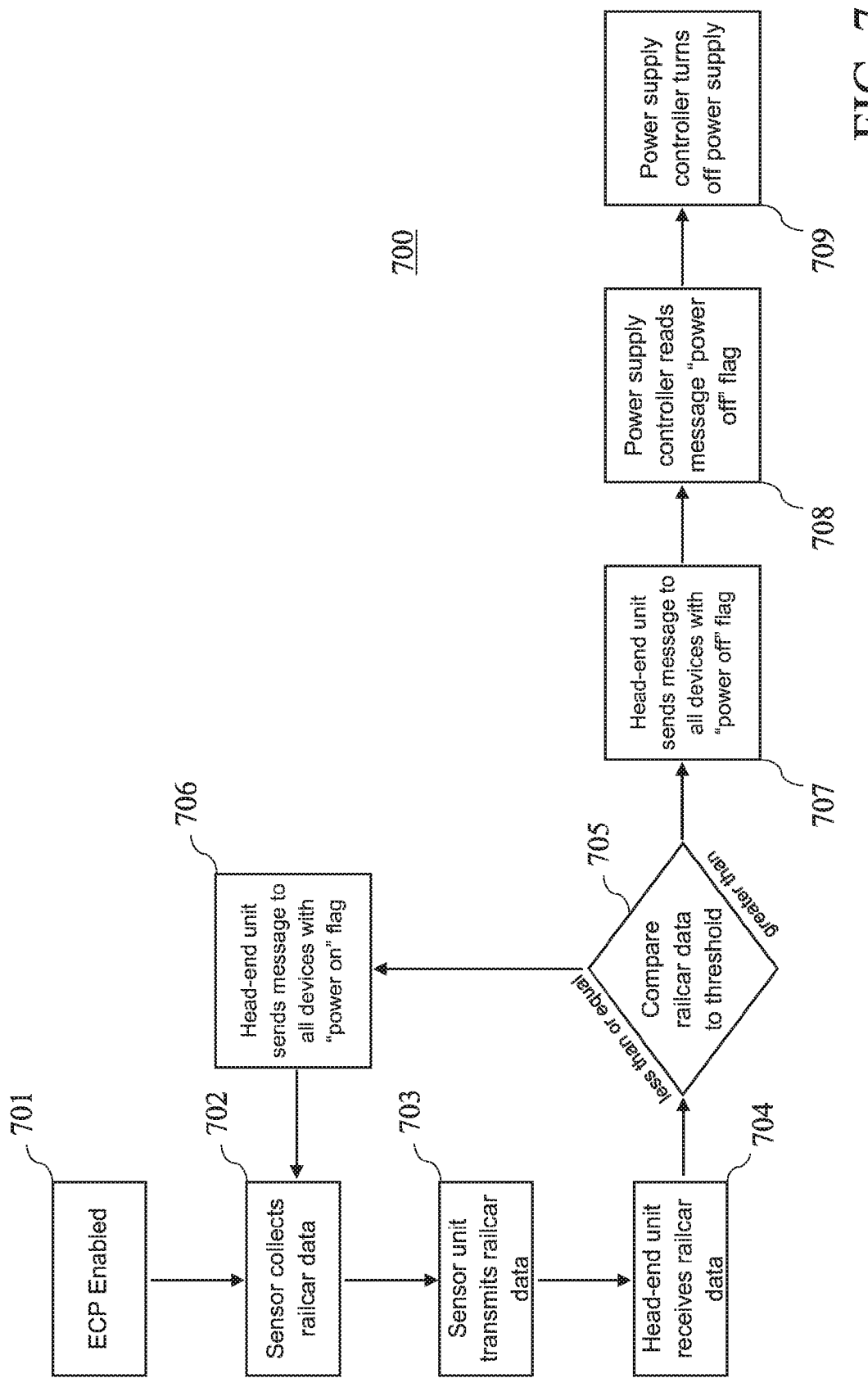
FIG. 7 is a flow diagram of one embodiment of a detection method for an ECP-enabled railcar, implemented partly by an on-board computer and a sensor unit.

In a further preferred and non-limiting embodiment or aspect, and as illustrated in FIG. 7, provided is a computer-implemented method 700 for monitoring and responding to at least one railcar's 101 derailment for at least one on-board computer 203. First, the ECP system is enabled (Step 701). Next, railcar 101 data is collected via a sensor 106 (Step 702), which may include a level of vibration, flexion, compression, angular velocity, tilt, external temperature, and/or internal temperature of the railcar 101, or any combination thereof (or any other data point that, when compared to a threshold, is indicative of a railcar derailment).

The data is then transmitted (Step 703), either directly from the sensor 106 or from the sensor unit 104 to the on-board computer 203, which receives the data (Step 704). The on-board computer 203 compares the railcar 101 data to a threshold condition or parameter (Step 705), which may be a preset value or dynamically determined value based on other information about the railcar 101, such as speed, track location, railcar 101 location within the trainline, and the like. If the railcar 101 data does not exceed the threshold, the on-board computer sends a message to all on-board devices containing a "power on" flag, thereafter proceeding to repeat the collection of railcar 101 data (Step 702), data transmission and reception (Steps 703-704), and threshold comparison (Step 705). Alternatively, if the railcar 101 data does exceed the threshold, the on-board computer 203 proceeds to Steps 707-709. In these steps, the on-board computer sends a message to all devices containing a "power off" flag (Step 707), which is read by the power supply controller 204 (Step 708), which in turn causes the power supply 205 to deactivate (Step 709). The above steps carried out by the on-board computer 203 may be carried out by another like on-board computer.

In one preferred and non-limiting embodiment or aspect, the on-board computer 203, ENI 103 (e.g., local controller), and/or EOT 206 are programmed or configured to automatically sense the type of material on the railcar 101 and activate, deactivate, or otherwise implement at least a portion of the presently-invented system based thereon. In another preferred and non-limiting embodiment or aspect, the on-board computer 203, ENI 103 (e.g., local controller), and/or EOT 206 are programmed or configured to determine the type of material on the railcar 101 through analyzing the railcar data, a bill of lading, a manifest, and the like, and activate, deactivate, or otherwise implement at least a portion of the system based thereon. In a further preferred and non-limiting embodiment or aspect, the on-board computer 203, ENI 103 (e.g., local controller), and/or EOT 206 are programmed or configured to determine which railcar 101 or group or set of railcars 101 is carrying flammable cargo, and activate, deactivate, or otherwise implement at least a portion of the system based thereon, and/or activate, deactivate, or otherwise implement at least a portion of the system for only that railcar 101 or group or set of railcars 101.

In a still further preferred and non-limiting embodiment or aspect, the on-board computer 203, ENI 103 (e.g., local controller), and/or EOT 206 are programmed or configured to communicate over a wireless network (e.g., a radio network), such that the messages and commands may be transmitted wirelessly in addition to the trainline transmission, as an alternative to the trainline transmission, or based upon some condition or parameter associated with the trainline 102. In another preferred and non-limiting embodiment or aspect, the railcar data may include the sensing or determination of a break in the trainline 102, such as by the on-board computer 203, ENI 103 (e.g., local controller), and/or EOT 206 determining that trainline communication has been terminated, such as the trainline 102 severing due to the derailment of the railcar 101. Accordingly, the railcar data that is used to generate the messages and cause the deactivation of the power supply 205 (such as through the power supply controller 204) may include a variety of parameters and conditions that would be indicative of a derailment or a leakage of flammable cargo. In another preferred and non-limiting embodiment, the sensor unit 104 comprises or includes a processor 105 and/or sensor 106 that is programmed or configured to automatically sense or determine that a leak has occurred by sensing the environmental or atmospheric conditions (e.g., physical conditions, chemical analysis, pH analysis, and the like) on or around the railcar 101, and activate, deactivate, or otherwise implement at least a portion of the system based thereon.

Although the invention has been described in detail for the purpose of illustration based on what is currently considered to be the most practical and preferred and non-limiting embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A safety system for a train equipped with an ECP air brake arrangement, wherein the train comprises at least one locomotive and at least one railcar connected to a trainline network of a trainline positioned on and between the at least one locomotive and the at least one railcar, the trainline configured to transmit communication signals and electrical power to ECP system components of the at least one railcar, the system comprising:
   at least one power supply positioned on the train that is configured to transmit electricity via the trainline for operation of ECP air brakes on the at least one railcar;
   at least one power supply controller positioned on the train and programmed or configured to communicate over the trainline network and control the at least one power supply;
   at least one local controller positioned on the at least one railcar and programmed or configured to:
   (a) communicate over the trainline network;
   (b) receive or determine railcar data comprising a condition or parameter associated with the at least one railcar;
   (c) compare the railcar data to a threshold condition or parameter that is indicative of derailment;
   (d) determine that the railcar data surpasses the threshold condition or parameter;
   (e) determine, based on the railcar data, that the at least one railcar is configured to carry cargo of a predetermined type of material; and
   (f) in response to determining that the railcar data surpasses the threshold condition or parameter and that the at least one railcar is configured to carry cargo of the predetermined type of material, generate at least one first message transmitted at least partially through the trainline network configured to cause the at least one power supply controller to deactivate power supplied to the at least one railcar from the at least one power supply positioned on the train.

2. The safety system of claim 1, further comprising:
   at least one sensor unit positioned on the at least one railcar, comprising at least one sensor controller and at least one of the following: an accelerometer, a flex sensor, a pressure sensor, a gyro sensor, a tilt sensor, an ambient air temperature sensor, a car payload temperature sensor, or any combination thereof, wherein the at least one sensor unit is configured to monitor or sense at least one of the following attributes of the railcar: vibration, flexion, compression, angular velocity, tilt, external temperature, internal temperature, or any combination thereof, and wherein the railcar data associated with the at least one railcar comprises at least one of the following: a level of vibration, a level of flexion, a level of compression, a level of angular velocity, a level of tilt, a level of external temperature, a level of internal temperature, or any combination thereof.

3. The safety system of claim 2, wherein the at least one local controller is further programmed or configured to:
transmit the railcar data to at least one on-board computer that is configured or programmed to display or cause to display the railcar data to a locomotive operator; and
in response to determining that the railcar data surpasses the threshold condition or parameter, transmit, or cause to be transmitted, an alert to the locomotive operator.

4. The safety system of claim 2, wherein the at least one first message is a message to the at least one power supply controller configured to cause the power supply controller to deactivate the at least one power supply.

5. The safety system of claim 2, the system further comprising:
at least one on-board computer programmed or configured to send at least one second message to the at least one power supply controller, wherein the at least one power supply controller is further programmed or configured to:
receive the at least one second message; and
based at least partially on the at least one second message, deactivate the at least one power supply.

6. The safety system of claim 5, wherein the at least one first message is a message to the on-board computer configured to cause the on-board computer to send a second message to the at least one power supply controller, the second message configured to deactivate the at least one power supply.

7. The safety system of claim 5, wherein the at least one first message is a plurality of messages, the plurality of messages comprising at least the following:
(a) a message to the on-board computer configured to cause the on-board computer to send a second message to the at least one power supply controller, the second message configured to deactivate the at least one power supply; and
(b) a message to the at least one power supply controller configured to cause the power supply controller to deactivate the at least one power supply.

8. The safety system of claim 5, wherein the at least one second message comprises a power state flag that represents either a powered-on state or a powered-off state, and wherein the at least one power supply controller is further programmed or configured to deactivate the at least one power supply based at least partially on the power state flag.

9. A computer-implemented method for monitoring and responding to at least one railcar's derailment, for a train equipped with an ECP air brake arrangement, wherein the train comprises at least one locomotive and the at least one railcar connected to a trainline network of a trainline positioned on and between the at least one locomotive and the at least one railcar, the trainline configured to transmit communication signals and electrical power to ECP system components of the at least one railcar, the method comprising:
(a) receiving or determining railcar data comprising a condition or parameter associated with the at least one railcar;
(b) comparing the railcar data to a threshold condition or parameter that is indicative of railcar derailment;
(c) determining that the railcar data surpasses the threshold condition or parameter;
(d) determining, based on the railcar data, that the at least one railcar is configured to carry cargo of a predetermined type of material; and
(e) in response to determining that the railcar data surpasses the threshold condition or parameter and that the at least one railcar is configured to carry cargo of the predetermined type of material, transmitting at least one first message at least partially through the trainline network configured to cause at least one power supply controller to deactivate power supplied to the at least one railcar from at least one power supply positioned on the train that is configured to transmit electricity via the trainline.

10. The computer-implemented method of claim 9, further comprising:
transmitting the railcar data to at least one on-board computer that is configured or programmed to display or cause to display the railcar data to a locomotive operator; and
in response to determining that the railcar data surpasses the threshold condition or parameter, transmitting, or causing to be transmitted, an alert to the locomotive operator.

11. The computer-implemented method of claim 9, further comprising repeating steps (a), (b), and (c) until it is determined that the railcar data surpasses the threshold condition or parameter.

12. The computer-implemented method of claim 9, wherein the at least one first message is a message to at least one power supply controller configured to cause the at least one power supply controller to deactivate the at least one power supply.

13. The computer-implemented method of claim 9, further comprising sending periodic messages to at least one power supply controller, wherein the at least one first message triggers the transmission of a new message of the periodic messages to the at least one power supply controller, wherein the at least one power supply controller is programmed or configured to deactivate the at least one power supply based at least partially on the new message.

14. The computer-implemented method of claim 13, wherein the periodic messages comprise a power state flag that represents either a powered-on state or a powered-off state, wherein the new message comprises a new power state flag being set to represent a powered-off state, and wherein the at least one power supply controller is programmed or configured to deactivate the at least one power supply based at least partially on the new power state flag.

15. The computer-implemented method of claim 9, further comprising sending periodic messages to at least one power supply controller, wherein the at least one first message is a plurality of messages, the plurality of messages comprising at least one the following: (a) a message to send a new message of the periodic messages to the at least one power supply controller, wherein the at least one power supply controller is programmed or configured to deactivate the at least one power supply based at least partially on the new message; and (b) a message to the at least one power supply controller to deactivate the at least one power supply.

16. The computer-implemented method of claim 15, wherein the periodic messages comprise a power state flag that represents either a powered-on state or a powered-off state, wherein the new message comprises a new power state flag being set to represent a powered-off state, and wherein the at least one power supply controller is programmed or configured to deactivate the at least one power supply based at least partially on the new power state flag.

17. A computer program product comprising a non-transitory computer-readable medium including program instructions that, when executed by at least one computer including at least one processor, causes the at least one computer to:

receive railcar data comprising a condition or parameter associated with at least one railcar in a train comprising at least one locomotive, the at least one locomotive and the at least one railcar connected to a trainline network of a trainline positioned on and between the at least one locomotive and the at least one railcar, the trainline configured to transmit communication signals and electrical power to ECP system components of the at least one railcar;

compare the railcar data to a threshold condition or parameter that is indicative of derailment;

determine that the railcar data surpasses the threshold condition or parameter;

determine, based on the railcar data, that the at least one railcar is configured to carry cargo of a predetermined type of material; and in response to determining that the railcar data surpasses the threshold condition or parameter and that the at least one railcar is configured to carry cargo of the predetermined type of material, transmit at least one first message at least partially through the trainline network configured to cause a power supply controller to deactivate power supplied to the at least one railcar from at least one power supply positioned on the train that is configured to transmit electricity via the trainline.

18. The computer program product of claim 17, the program instructions further configured to cause the at least one computer to display or cause to display the railcar data to a locomotive operator, and in response to determining that the railcar data surpasses the threshold condition or parameter, transmit, or cause to be transmitted, an alert to the locomotive operator.

19. The computer program product of claim 17, the program instructions further configured to cause the at least one computer to repeatedly receive new railcar data comprising a condition or parameter associated with the at least one railcar, compare the new railcar data to the threshold condition or parameter, and determine if the new railcar data surpasses the threshold condition or parameter until determining that the new railcar data surpasses the threshold condition or parameter.

20. The computer program product of claim 17, wherein the at least one first message is a message to at least one power supply controller to deactivate the at least one power supply.

21. The computer program product of claim 17, the program instructions further being configured to cause the at least one computer to send periodic messages to at least one power supply controller, wherein the at least one first message triggers the transmission of a new message of the periodic messages to the at least one power supply controller, wherein the at least one power supply controller is programmed or configured to deactivate the at least one power supply based at least partially on the new message.

22. The computer program product of claim 17, the program instructions further being configured to cause the at least one computer to send periodic messages to at least one power supply controller, wherein the at least one first message is a plurality of messages, the plurality of messages comprising at least the following: (a) a message to send a new message of the periodic messages to the at least one power supply controller, wherein the at least one power supply controller is programmed or configured to deactivate the at least one power supply based at least partially on the new message; and (b) a message to the at least one power supply controller to deactivate the at least one power supply.

23. The computer program product of claim 21, wherein the periodic messages comprise a power state flag that represents either a powered-on state or a powered-off state, wherein the new message comprises a new power state flag being set to represent a powered-off state, and wherein the at least one power supply controller is programmed or configured to deactivate the at least one power supply based at least partially on the new power state flag.

24. The computer program product of claim 22, wherein the periodic messages comprise a power state flag that represents either a powered-on state or a powered-off state, wherein the new message comprises a new power state flag being set to represent a powered-off state, and wherein the at least one power supply controller is programmed or configured to deactivate the at least one power supply based at least partially on the new power state flag.

* * * * *